United States Patent
Bissacco et al.

(10) Patent No.: US 8,520,949 B1
(45) Date of Patent: Aug. 27, 2013

(54) SELF-SIMILAR DESCRIPTOR FILTERING

(75) Inventors: Alessandro Bissacco, Los Angeles, CA (US); Ulrich Buddemeier, Sebastopol, CA (US); Hartmut Neven, Malibu, CA (US)

(73) Assignee: Google Inc., Mountain View, CA (US)

( * ) Notice: Subject to any disclaimer, the term of this patent is extended or adjusted under 35 U.S.C. 154(b) by 1082 days.

(21) Appl. No.: 12/489,345

(22) Filed: Jun. 22, 2009

Related U.S. Application Data

(60) Provisional application No. 61/074,525, filed on Jun. 20, 2008.

(51) Int. Cl.
*G06K 9/00* (2006.01)

(52) U.S. Cl.
USPC .......................... 382/190; 382/305

(58) Field of Classification Search
None
See application file for complete search history.

(56) References Cited

U.S. PATENT DOCUMENTS

| | | | |
|---|---|---|---|
| 7,761,466 B1 * | 7/2010 | Eshghi | 707/772 |
| 8,086,616 B1 * | 12/2011 | Bissacco et al. | 707/758 |
| 8,200,025 B2 * | 6/2012 | Woodbeck | 382/224 |
| 2006/0233423 A1 * | 10/2006 | Najafi et al. | 382/103 |
| 2010/0104158 A1 * | 4/2010 | Shechtman et al. | 382/131 |
| 2011/0299770 A1 * | 12/2011 | Vaddadi et al. | 382/165 |
| 2012/0011119 A1 * | 1/2012 | Baheti et al. | 707/737 |

OTHER PUBLICATIONS

Lowe, D.G. (2004) "Distinctive image features from scale-invariant keypoints." Int'l J. Computer Vision, vol. 60 No. 2, pp. 91-110.*

Mortensen et al. (Jun. 2005) "A SIFT descriptor with global context." Proc. 2005 IEEE Comp. Sci. Conf. on Computer Vision and Pattern Recognition, vol. 1 pp. 184-190.*

Zitnick et al. (Apr. 2007) "Object instance recognition using triplets of feature symbols." Microsoft Research Technical Report MSR-TR-2007-53.*

Baumberg, A. (2000) "Reliable feature matching across widely separated views." Proc. 2000 IEEE Conf. on Computer Vision and Pattern Recognition, vol. 1 pp. 774-781.*

Manduchi et al. (Aug. 2005) "Ambiguity in stereo matching." Retrieved from The Internet Archive, http://www.archive.org/ , as archived from http://www.vision.caltech.edu/manduchi/LAF3.pdf.*

Pollard et al. (1985) "PMF: A stereo correspondence algorithm using a disparity gradient limit." Perception, vol. 14 No. 4, pp. 449-470.*

Dorkó, G., et al., "Object Class Recognition Using Discriminative Local Features", *IEEE Transactions on Pattern Analysis and Machine Intelligence*, Oct. 25, 2004, 26 pages.

* cited by examiner

*Primary Examiner* — Barry Drennan
(74) *Attorney, Agent, or Firm* — Mahamedi Paradice Kreisman LLP; Van Mahamedi

(57) ABSTRACT

According to an embodiment, a method for filtering feature point matches for visual object recognition is provided. The method includes identifying local descriptors in an image and determining a self-similarity score for each local descriptor based upon matching each local descriptor to its nearest neighbor descriptors from a descriptor dataset. The method also includes filtering feature point matches having a number of local descriptors with self-similarity scores that exceed a threshold. According to another embodiment, the filtering step may further include removing feature point matches. According to a further embodiment, a system for filtering feature point matches for visual object recognition is provided. The system includes a descriptor identifier, a self-similar descriptor analyzer and a self-similar descriptor filter.

25 Claims, 3 Drawing Sheets

SELF-SIMILAR DESCRIPTOR FILTERING

This application claims the benefit of U.S. Provisional Appl. No. 61/074,525, filed Jun. 20, 2008, which is herein incorporated by reference in its entirety.

FIELD OF THE INVENTION

Embodiments of the present invention relate to image matching and object recognition technologies.

BACKGROUND

Image matching techniques may be used in a variety of applications such as control of industrial processes, tracking, detecting events, organizing or retrieving image data, and object or place recognition.

The effectiveness of object recognition may depend on the image matching algorithm that is used by an object recognition process. An image matching algorithm may utilize a computed parameter such as a descriptor of a digital image for use by the recognition process. A descriptor of a digital image, for example, may refer to characteristics and/or features of an image. Descriptors may also be local and need not describe an entire image or an object in an image. Descriptors for different images may be compared using a variety of distance metrics to find matching regions in other images.

Some objects and landmarks in images have regular patterns. For example, grids, checkerboards and windows in buildings are regular repeating patterns. Such patterns are likely to produce false matches when using local descriptors for object recognition. Lacking distinctiveness, these patterns tend to form clusters of local point matches between similar structures that are geometrically consistent. This consistency may lead to high matching confidence scores even though the images are a mismatch.

Systems and methods for visual object recognition are needed that reduce false matches and improve performance of an image matching process as compared to present methods.

BRIEF SUMMARY

Embodiments of the present invention relate to systems and methods for filtering feature point matches for visual object recognition. According to an embodiment, a method for filtering descriptors for visual object recognition is provided. The method includes identifying one or more local descriptors in an image and determining a self-similarity score for each local descriptor based upon matching each local descriptor to one or more nearest neighbor descriptors of the local descriptor from a descriptor dataset. The method also includes filtering one or more feature point matches having a number of local descriptors with self-similarity scores that exceed a threshold. According to another embodiment, the filtering step may further include removing one or more feature point matches having a number of local descriptors with self-similarity scores that exceed a threshold.

According to a further embodiment, a system for filtering feature point matches for visual object recognition is provided. The system includes a descriptor identifier configured to identify one or more local descriptors in an image. The system also includes a self-similar descriptor analyzer configured to determine a self-similarity score for each local descriptor based upon matching each local descriptor to one or more nearest neighbor descriptors of the local descriptor from a descriptor dataset. The system further includes a self-similar descriptor filter configured to filter one or more feature point matches having a number of local descriptors with self-similarity scores that exceed a threshold.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments described herein refer to systems and methods for filtering feature point matches for visual object recognition. Visual object recognition may be improved by reducing or eliminating false positive matches. According to an embodiment, false positive matches may be reduced by reducing feature point matches that have a number of local descriptors with self-similarity scores that exceed a threshold. A self-similarity score is a score representing how often a descriptor matches to other similar descriptors. A self-similarity score for a local descriptor may be determined based upon matching the local descriptor to its nearest neighbor descriptors. Nearest neighbor descriptors are descriptors that are identified at similar feature points. The more descriptors that a local descriptor is similar to or that come from the same images, the higher its self-similarity score may be. For example, a self-similarity score may be computed based upon a fraction of approximate nearest neighbor descriptors that come from the same nearest neighbor image or reference image.

Figure 1:
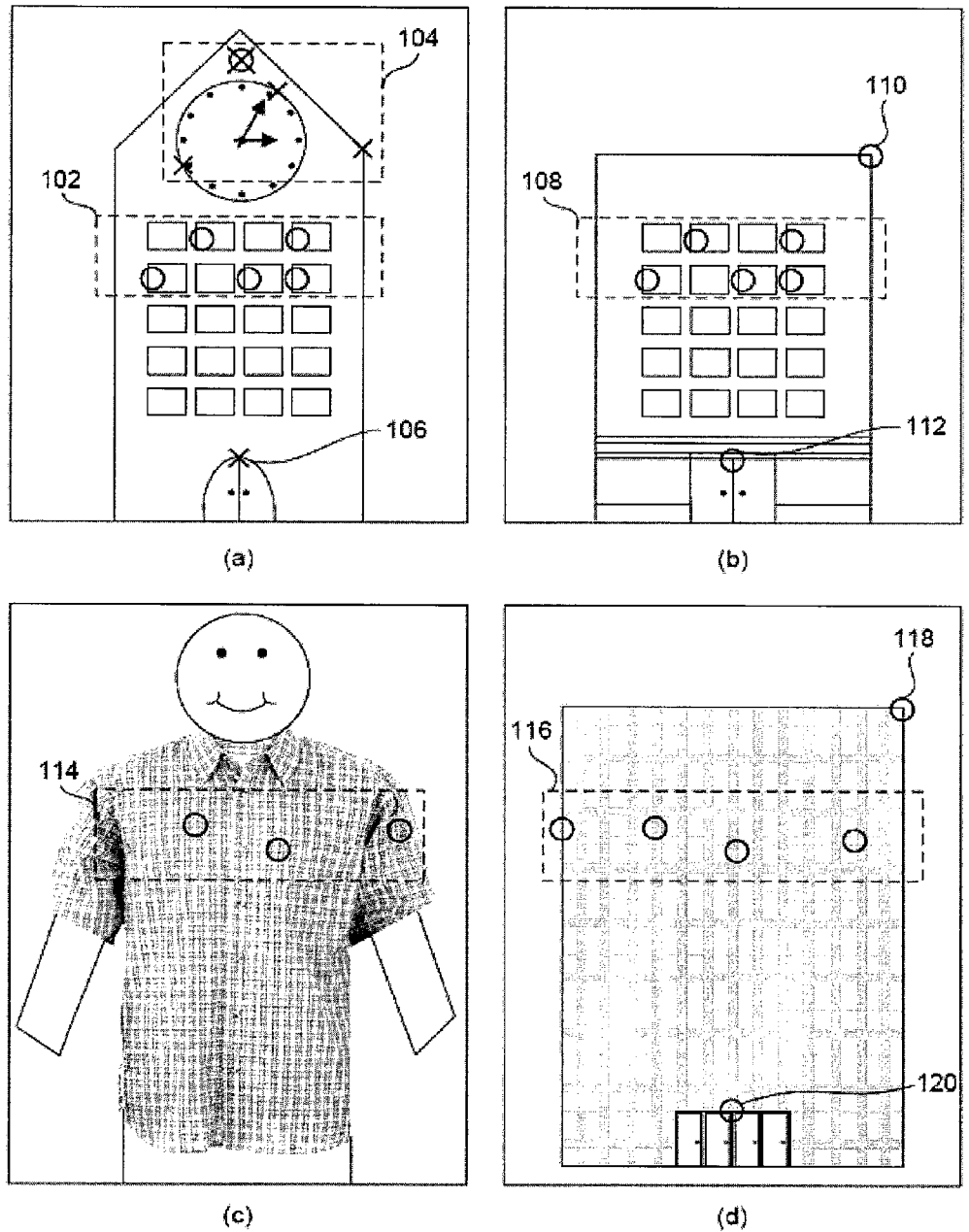
FIG. 1 illustrates nearest neighbor descriptors, according to an embodiment of the present invention.

To illustrate nearest neighbor descriptors and self-similarity scores, FIG. 1 shows four diagrams, (a), (b), (c) and (d), that represent objects in images that are matched using local descriptors, according to an embodiment. Diagram (a) represents a query image and diagrams (b), (c) and (d) may represent either nearest neighbor images or reference images. Diagram (a) represents an image of a clock tower. Diagram (b) represents a different but similar building that has a nearly identical repeating pattern of windows. Diagram (c) represents a person wearing a shirt with a regular repeating grid pattern. Diagram (d) represents another building that has a similar door location and a repeating pattern of windows. Descriptor clusters 108, 114 and 116 may be considered nearest neighbor descriptors of descriptor cluster 102. Descriptors 112 and 120 may be considered nearest neighbor descriptors of descriptor 106. Descriptor cluster 104 and descriptors 110 and 118 may be considered to be other non-neighbor descriptors.

In a first example, the cluster of descriptors 102 identified at certain feature points of diagram (b) contains descriptors that appear to be consistent in geometry and spacing with each other in a regular repeating pattern. The descriptors of cluster 108 also appear to be consistent in geometry, spacing and number with each other and the descriptors in cluster 102. Descriptors in cluster 108 appear to match well with descriptors in cluster 102 and are found within the same reference image, diagram (b). For purposes of this example, these descriptors may receive a high self similarity score. The descriptors in cluster 114 and 116 might also receive decent self-similarity scores because of the repeating patterns of similar geometry, however, they may receive smaller self-similarity scores due to the lesser quality of the matches.

In a second example, descriptors 112 and 120, located at the top of two doors in diagrams (b) and (d) respectively, are nearest neighbor descriptors of descriptor 106 located at the top of two doors in diagram (a). Though feature points at each of these descriptors may not be identical, for purposes of this example, they are similar enough to be considered nearest neighbor descriptors based upon similar feature point locations and the fact that the feature points include vertical lines that intersect a top line. Qualifications for nearest neighbor descriptors may vary. Descriptor 106 may receive a decent self-similarity score if we assume these nearest neighbor descriptors may be found within the same images as other self-similar nearest neighbor descriptors, such as those in cluster 108. However, self-similarity scores may be lower for single descriptors than for clusters of descriptors that represent a regular repeating pattern, such as the descriptors of cluster 102.

In a third example, descriptors 110 and 118 are located at the top of buildings in diagrams (b) and (d) respectively. Descriptors 110 and 118 may not be nearest neighbor descriptors of the cluster of descriptors 104 of diagram (a). Assuming that descriptors similar to the descriptors of cluster 104 are few or none, for purposes of this example, descriptors in cluster 104 may receive little or no self-similarity scores, according to an embodiment.

According to an embodiment, self-similarity scores may be determined based on a number of nearest neighbor descriptors that appear in the query image. According to a further embodiment, self-similarity scores may be determined based on a number of times a nearest neighbor descriptor appears in a reference image. According to an embodiment, self-similarity scores may be determined based on a number of times a nearest neighbor descriptor appears in a set of two or more images. Note that it may be possible to find nearest neighbor descriptors in images that are not necessarily nearest neighbor images, according to another embodiment.

Figure 2:
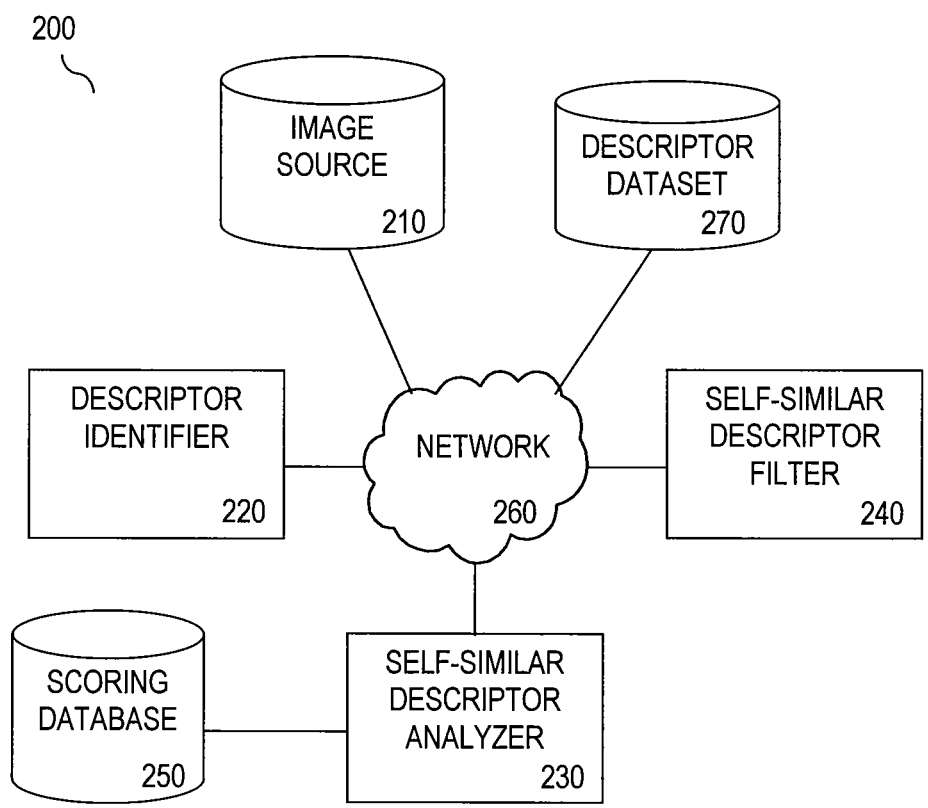
FIG. 2 illustrates a system for filtering feature point matches for visual object recognition, according to an embodiment of the present invention.

FIG. 2 illustrates an exemplary system 200 for filtering feature point matches, according to an embodiment. System 200 may include descriptor identifier 220, self-similar descriptor analyzer 230 and self-similar descriptor filter 240. Descriptor identifier 220, self-similar descriptor analyzer 230 and self-similar descriptor filter 240 may be coupled directly or indirectly, such as over one or more networks 260. According to another embodiment, system 200 may include scoring database 250. Scoring database 250 may be coupled to self-similar descriptor analyzer 230, directly or indirectly. According to a further embodiment, descriptor identifier 220 and/or self-similar descriptor analyzer 230 may be coupled to image source 210, directly or indirectly.

According to an embodiment, descriptor identifier 220 may be configured to identify one or more local descriptors in an image. Images may be received from image source 210 or descriptor dataset 270. Descriptor identifier 220 may be configured to identify at least one cluster of geometrically consistent descriptors in an image. Geometrically consistent descriptors involve feature points having geometric configurations that consistently appear within an image or across a number of images. Descriptor clusters 102 and 108 of FIG. 1 are examples of clusters of geometrically consistent descriptors. According to a further embodiment, descriptor identifier 220 may be configured to identify one or more descriptors in an image containing at least one repeating pattern. Examples of repeating patterns include, but are not limited to: grids, building windows, fences, tiles, artwork patterns, building structures and patterns in roofing or landscaping, etc.

Descriptor identifier 220 may perform several functions. Descriptor identifier 220, according to an embodiment, may be configured to identify or extract local image descriptors using an interest point detector. Interest point detectors may include, but are not limited to, Laplacian of Gaussian interest point detectors. According to another embodiment, descriptor identifier 220 may be configured to identify nearest neighbor descriptors from nearest neighbor images. Nearest neighbor descriptors may be stored in descriptor dataset 270. According to a further embodiment, nearest neighbor descriptors generated elsewhere may be stored in descriptor dataset 270. According to another embodiment, descriptor identifier 220 may be configured to label descriptors.

Self-similar descriptor analyzer 230, according to an embodiment, may be configured to determine a self-similarity score for each local descriptor based upon matching each local descriptor to one or more nearest neighbor descriptors of the local descriptor from a descriptor dataset, such as descriptor dataset 270. Descriptor dataset 270 may also be a reference dataset. According to another embodiment, descriptor dataset 270 may be stored in scoring database 250.

According to an embodiment, self-similar descriptor analyzer 230 may be configured to assign a scoring weight to each nearest neighbor descriptor. Each scoring weight may contribute to or be used to calculate a self-similarity score. A scoring weight may be a value, score or any other metric used to help calculate a self-similarity score for a descriptor. According to another embodiment, scoring weights may be stored in scoring database 250.

A scoring weight may be assigned to a nearest neighbor descriptor according to the position of the nearest neighbor in a nearest neighbor descriptor list, according to an embodiment. The position in a list may be based upon matching each local descriptor to one or more nearest neighbor descriptors of the local descriptor from a reference descriptor dataset. The nearest neighbor descriptors may be from a reference descriptor dataset such as descriptor dataset 270. Descriptor dataset 270 may be coupled to self-similar descriptor analyzer 230, directly or indirectly. According to a further embodiment, a list of nearest neighbor descriptors may be computed by a kd-tree (data structure for organizing points in a k-dimensional space) during query. A list may be sorted according to how well a nearest neighbor descriptor matches one or more local descriptors, according to another embodiment. The sorted nearest neighbor descriptor list may be generated by self-similar descriptor analyzer 230. The list may be stored in descriptor dataset 270. The list may also be stored in scoring database 250. According to another embodiment, the list may be generated or sorted by another component.

A self-similarity score may be computed based upon a number of nearest neighbor descriptors of the local descriptor that appear in an image, according to an embodiment. According to another embodiment, a self-similarity score for each local descriptor may be computed based upon a number of times a nearest neighbor descriptor of the local descriptor appears in a set of images. It may also be necessary to determine how many of the same descriptors are associated with a specific image. According to a further embodiment, a self-similarity score may be defined as the fraction of approximate nearest neighbors (as returned by a kd-tree) to a query descriptor that come from the same reference image. The more often a nearest neighbor descriptor appears, the higher a self-similarity score for the nearest neighbor descriptor. It is also possible to examine individual descriptors in order to determine whether a particular descriptor will or will not be included in a descriptor dataset. According to a further embodiment, nearest neighbor descriptors may be labeled with a unique descriptor ID. A self-similarity score may then be determined based upon a number of times the unique descriptor ID appears in a set of images.

For example, consider a query image Iq and a dataset of object images $\{I1, I2, \ldots, In\}$. First, for each image Ii in the dataset, local image descriptors are identified. Each descriptor xi may be associated with the unique label id(xi) where id(xi)=id(Ii) and Ii is the label of the image from which it was extracted. For each descriptor xi extracted from the query image Iq, the set kNN(xi) is computed as kNN(xi)=$\{y1, \ldots, yk\}$ of k nearest neighbors to xi among all the descriptors of a reference dataset. The labels associated with these nearest neighbor descriptors is represented by $\{id(y1), id(yk)\}$.

According to this example, self-similarity score ss(xi) of the descriptor xi is defined as the fraction of nearest neighbor descriptors yj which come from the same images, i.e., whose label id(yj) appear more than once in the list $\{id(y1), \ldots, id(yk)\}$. For instance:

$ss(xi)=0$ for j in $\{1, 2, \ldots, k\}$
if id(yj)=id(y1) for any 1!=j, 1<=1<=k, then ss(xi)=ss(xi)+1/k In another example, scoring weights may be used to determine a self-similarity score. This may result in a finer selection. Weighted quality qw takes into account the position of the self-similar match in the sorted nearest neighbor list. For instance:

$ssw(xi)=0$ for j in $\{1, 2, \ldots, k\}$
if id(yj)=id(y1) for any 1!=j, 1<=1<=k,
then ssw(xi)=ssw(xi)+2*(k+1-j)/(k*(k+1))

It may be observed that $0<=ss(xi)<=1$ and $0<=ssw(xi)<=1$. The approach in this example uses a nearest neighbor list generated from matching the query descriptor to a reference dataset to evaluate a self-similarity score. This approach may exploit the fact that groups of self-similar descriptors in the query image will match groups of self-similar descriptors in reference images. Each query descriptor is likely to have multiple descriptors from the same reference image in its nearest neighbor list. This approach may have a lower computational cost than the more direct approach of comparing query descriptors against themselves and the dataset.

Self-similar descriptor filter 240 may be configured to filter one or more feature point matches having a number of local descriptors with self-similarity scores that exceed a threshold, according to an embodiment. The number may be predetermined. The number may be determined so that a certain amount of local descriptors will exceed a threshold. The number may be a quantity or associated with a score. According to an embodiment, the number may equal all local descriptors that have a sufficiently high self-similarity score. A threshold may be a value, score, confidence or any other metric or representation used for quantifying, classifying or distinguishing matches or descriptors.

According to an embodiment, filtering may include removing from a result set one or more feature point matches having a number of local descriptors with self-similarity scores that exceed a threshold. According to a further embodiment, filtering may include reducing a scoring weight of such feature point matches. According to an embodiment, filtering may include altering any formula or score involving such feature point matches.

Figure 3:
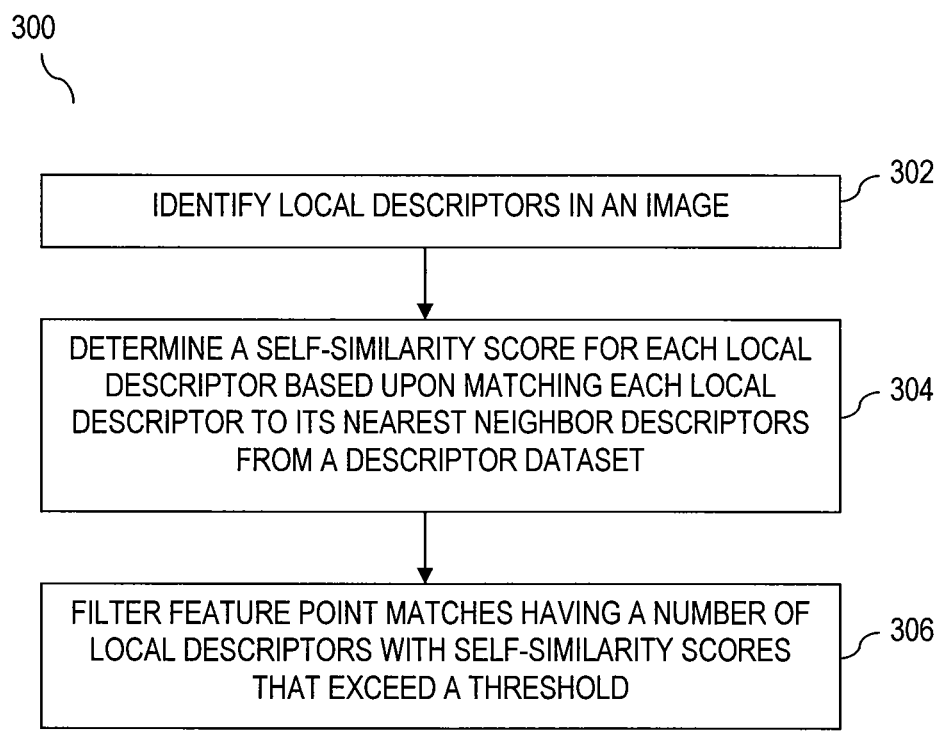
FIG. 3 illustrates a method for filtering feature point matches for visual object recognition, according to an embodiment of the present invention.

FIG. 3 illustrates an exemplary method 300, according to an embodiment, for filtering feature point matches for visual object recognition (302-306). In step 302, local descriptors are identified in an image. Step 302 may be performed by, for example, descriptor identifier 220. In step 304, a self-similarity score is determined for each local descriptor based upon matching each local descriptor to its nearest neighbor descriptors from a descriptor dataset. This step may be performed by, for example, self-similar descriptor analyzer 230. In step 306, feature point matches having a number of local descriptors with self-similarity scores that exceed a threshold are filtered. This step may be performed using, for example, self-similar descriptor filter 240.

Other methods are considered. According to an embodiment, a more direct, though possibly more inefficient, approach includes adding query descriptors to a nearest neighbor descriptor search and then counting how many nearest neighbor descriptors come from the query image. In another embodiment, a classifier may be trained to detect descriptors that are typically included in self-similar patterns.

According to an embodiment, self-similar descriptor filter 240 may output a result set of feature point matches or images. This set may have a reduced number of false positive images due to the filtering of feature point matches based upon self-similarity descriptor scores.

Aspects of the present invention, for example system 200 and/or method 300 or any part(s) or function(s) thereof may be implemented using hardware, software modules, firmware, tangible computer readable medium having instructions stored thereon, or a combination thereof and may be implemented in one or more computer systems or other processing systems.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for filtering feature point matches for visual object recognition comprising:
    using one or more processors to perform steps comprising:
        identifying one or more local descriptors in an image;
        determining a self-similarity score for each local descriptor by matching the local descriptor to one or more nearest neighbor descriptors of the local descriptor from a descriptor dataset, wherein the self-similarity score depends, at least in part, on the number of nearest neighbor descriptors that match a particular local descriptor; and
        filtering one or more feature point matches having a number of local descriptors with self-similarity scores that exceed a threshold.

2. The computer-implemented method of claim 1, wherein the filtering step includes removing one or more feature point matches having a number of local descriptors with self-similarity scores that exceed a threshold.

3. The computer-implemented method of claim 1, wherein the identifying step comprises identifying one or more descriptors in an image containing at least one repeating pattern.

4. The computer-implemented method of claim 1, wherein the identifying step comprises identifying at least one cluster of geometrically consistent descriptors.

5. The computer-implemented method of claim 1, wherein the self-similarity score for each local descriptor is computed based upon a number of nearest neighbor descriptors of the local descriptor that appear in the image.

6. The computer-implemented method of claim 1, wherein the self-similarity score for each local descriptor is computed based upon a number of times a nearest neighbor descriptor of the local descriptor appears in a reference image.

7. The computer-implemented method of claim 1, wherein the self-similarity score for each local descriptor is computed based upon a number of times a nearest neighbor descriptor of the local descriptor appears in a set of two or more images.

8. The computer-implemented method of claim 1, further comprising labeling each nearest neighbor descriptor with a unique descriptor ID and determining the self-similarity score for each local descriptor based upon a number of times the unique descriptor ID appears in each image of a set of images.

9. The computer-implemented method of claim 1, wherein the determining step further comprises assigning a scoring weight to each nearest neighbor descriptor according to a position of the nearest neighbor descriptor in a sorted nearest neighbor descriptor list, wherein the position in the list is based upon matching each local descriptor to one or more nearest neighbor descriptors of the local descriptor from a reference descriptor dataset and wherein each scoring weight contributes to the self-similarity score.

10. A system for filtering feature point matches for visual object recognition comprising:
    a descriptor identifier configured to identify one or more local descriptors in an image;
    a self-similar descriptor analyzer configured to determine a self-similarity score for each local descriptor by matching the local descriptor to one or more nearest neighbor descriptors of the local descriptor from a descriptor dataset, wherein the self-similarity score depends, at least in part, on the number of nearest neighbor descriptors that match a particular local descriptor; and
    a self-similar descriptor filter configured to filter one or more feature point matches having a number of local descriptors with self-similarity scores that exceed a threshold.

11. The system of claim 10, wherein the self-similar descriptor filter is further configured to remove one or more feature point matches having a number of local descriptors with self-similarity scores that exceed a threshold.

12. The system of claim 10, wherein the descriptor identifier is further configured to identify one or more descriptors in an image containing at least one repeating pattern.

13. The system of claim 10, wherein the descriptor identifier is further configured to identify at least one cluster of geometrically consistent descriptors.

14. The system of claim 10, wherein the self-similarity score for each local descriptor is computed based upon a number of nearest neighbor descriptors of the local descriptor that appear in the image.

15. The system of claim 10, wherein the self-similarity score for each local descriptor is computed based upon a number of times a nearest neighbor descriptor of the local descriptor appears in a reference image.

16. The system of claim 10, wherein the self-similarity score for each local descriptor is computed based upon a number of times a nearest neighbor descriptor of the local descriptor appears in a set of two or more images.

17. The system of claim 10, wherein the self-similar descriptor analyzer is further configured to label each nearest neighbor descriptor with a unique descriptor ID and determine the self-similarity score for each local descriptor based upon a number of times the unique descriptor ID appears in each image of a set of images.

18. The system of claim 10, wherein the self-similar descriptor analyzer is further configured to assign a scoring weight to each nearest neighbor descriptor according to a position of the nearest neighbor descriptor in a sorted nearest neighbor descriptor list, wherein the position in the list is based upon matching each local descriptor to one or more nearest neighbor descriptors of the local descriptor from a reference descriptor dataset and wherein each scoring weight contributes to the self-similarity score.

19. A computer program product comprising a tangible computer readable medium having control logic stored therein for causing a computer to filter feature point matches for visual object recognition, the computer control logic comprising:
    first computer readable program code that causes the computer to identify one or more local descriptors in an image;
    second computer readable program code that causes the computer to determine a self-similarity score for each local descriptor by matching the local descriptor to one or more nearest neighbor descriptors of the local descriptor from a descriptor dataset, wherein the self-similarity score depends, at least in part, on the number of nearest neighbor descriptors that match a particular local descriptor; and
    third computer readable program code that causes the computer to filter one or more feature point matches having a number of local descriptors with self-similarity scores that exceed a threshold.

20. The computer program product of claim 19, wherein the third computer readable program code causes the computer to remove one or more feature point matches having a number of local descriptors with self-similarity scores that exceed a threshold.

21. The computer program product of claim 19, wherein the self-similarity score for each local descriptor is computed based upon a number of nearest neighbor descriptors of the local descriptor that appear in the image.

22. The computer program product of claim 19, wherein the self-similarity score for each local descriptor is computed based upon a number of times a nearest neighbor descriptor of the local descriptor appears in a reference image.

23. The computer program product of claim 19, wherein the self-similarity score for each local descriptor is computed based upon a number of times a nearest neighbor descriptor of the local descriptor appears in a set of two or more images.

24. The computer program product of claim 19, wherein the second computer readable program code causes the computer to label each nearest neighbor descriptor with a unique descriptor ID and determine the self-similarity score for each local descriptor based upon a number of times the unique descriptor ID appears in each image of a set of images.

25. The computer program product of claim 19, wherein the second computer readable program code causes the computer to assign a scoring weight to each nearest neighbor descriptor according to a position of the nearest neighbor descriptor in a sorted nearest neighbor descriptor list, wherein the position in the list is based upon matching each local descriptor to one or more nearest neighbor descriptors of the local descriptor from a reference descriptor dataset and wherein each scoring weight contributes to the self-similarity score.

\* \* \* \* \*